United States Patent
Betarbet

(10) Patent No.: US 8,065,318 B2
(45) Date of Patent: Nov. 22, 2011

(54) SYSTEMS AND METHODS FOR MANAGING APPLICATION CONFIGURATION

(75) Inventor: Sandeep Betarbet, Lilburn, GA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 517 days.

(21) Appl. No.: 11/101,682

(22) Filed: Apr. 8, 2005

(65) Prior Publication Data
US 2006/0242637 A1 Oct. 26, 2006

(51) Int. Cl.
*G06F 7/00* (2006.01)
*G06F 17/30* (2006.01)

(52) U.S. Cl. ......... 707/769; 717/168; 717/173; 707/802

(58) Field of Classification Search .................. 707/769
See application file for complete search history.

(56) References Cited

U.S. PATENT DOCUMENTS

| 5,675,510 A * | 10/1997 | Coffey et al. ............ 709/224 |
| 6,073,137 A * | 6/2000 | Brown et al. ............ 707/104.1 |
| 6,553,387 B1 * | 4/2003 | Cabrera et al. ............ 707/200 |
| 6,694,321 B1 * | 2/2004 | Berno ............ 707/101 |
| 6,704,737 B1 * | 3/2004 | Nixon et al. ............ 707/101 |
| 6,839,717 B1 * | 1/2005 | Motoyama et al. ......... 707/104.1 |
| 7,236,987 B1 * | 6/2007 | Faulkner et al. ............ 707/104.1 |
| 2005/0033764 A1 * | 2/2005 | Reid ............ 707/102 |
| 2006/0123016 A1 * | 6/2006 | Ashok et al. ............ 707/100 |

* cited by examiner

*Primary Examiner* — Apu Mofiz
*Assistant Examiner* — Mohammad Rahman
(74) *Attorney, Agent, or Firm* — Jennifer P. Medlin, Esq.

(57) ABSTRACT

Systems and methods are provided for managing an application configuration using messaging over a communications network. A configuration message including configuration changes to the application and a corresponding effective date when the configuration changes are to be applied to the application is received. Following the receipt of the configuration message, the message is stored. When the effective date occurs, the configuration changes from the received configuration message are applied to the current configuration of the application.

16 Claims, 5 Drawing Sheets

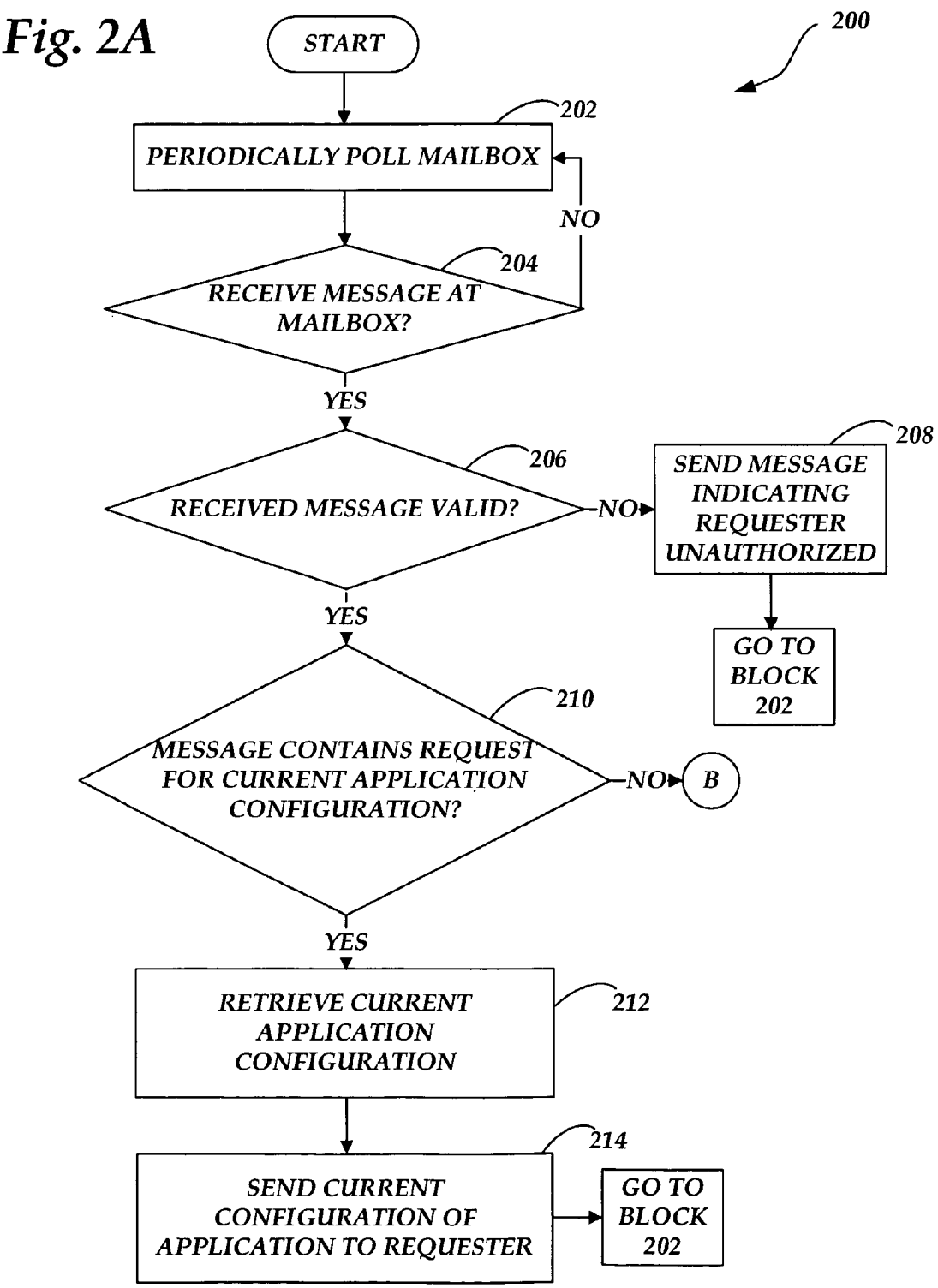

SYSTEMS AND METHODS FOR MANAGING APPLICATION CONFIGURATION

FIELD OF THE INVENTION

The present invention relates generally to managing application configuration and, more particularly, to managing application configuration by messaging over a communications network.

BACKGROUND OF THE INVENTION

Applications are designed to perform specific functions for end users or, in some instances, for other applications. In order to perform these specific functions, applications must be configured. On occasion, an application configuration must be changed due to periodic updates, remedial updates, or incidental updates. For example, due to security concerns, an application configuration may need to be periodically updated to change associated passwords. Also, new releases of an application may require changes to the configuration of the application. Moreover, an application configuration may need to be changed to remedy problems caused by changes in usage patterns including excessive traffic to a website or large latency in a specific network path. On the other hand, changes in resources on which an application depends may instigate a need for changes in the configuration of the application. For example, an application may depend on a remote web server to perform specific functions. If changes are made to the remote web server, the configuration of the application may also need to be changed so that the application continues to perform as designed.

Currently, applications from numerous entities reside in a data center managed by an unrelated third party entity. These data centers utilize security perimeters, such as firewalls, which limit access to the applications to application operators associated with the third party entity. In order to initiate changes to the configuration of an application, an entity must go through the third party. For example, when the configuration of an application needs to be changed, the associated entity must contact the third party that manages the application and open a trouble ticket, which is then assigned to an application operator within the third party. Once the trouble ticket is assigned, the entity must try to explain the desired changes to the application operator as the application operator accesses the application configuration and makes changes.

Since third party entities manage a variety of applications for numerous entities, application operators for the third parties are typically not assigned dedicated applications to manage. Instead, the application operator available to handle the next trouble ticket is assigned, regardless of the application operator's knowledge about the corresponding application. Thus, the application operator assigned to change the configuration of an application likely does not understand the business impact of the requested change in the application configuration or the specific function for which the application was designed. As a result, unnecessary time is spent providing the application operator with enough information to change to application configuration. Once the application configuration is changed and the application is restarted, errors in the configuration often occur either because the application operator did not fully understand the directions provided by the entity or because sufficient care was not taken to correctly configure the application. This lack of knowledge regarding the application configuration on the part of the assigned application operator causes the process of changing the configuration to be inefficient, time consuming, and expensive.

When changes are made to the configuration of an application, the update is required to be documented so that a current application configuration can be referenced. However, in practice, updates are typically not documented. Thus, when further updates to the application configuration are needed, a copy of the current application configuration must be requested from the third party entity where the application resides. Similar to the process of changing the application configuration, an entity associated with the application would have to go through the third party to obtain a copy of the current application configuration, which causes an unnecessary delay in providing further changes to the application configuration.

SUMMARY OF THE INVENTION

In accordance with the present invention, the above and other problems are addressed by methods and systems for managing an application configuration. Changes and updates to an application configuration can be sent to an application configuration agent that applies the changes and updates to the configuration of the application, eliminating the need for assistance from an application operator.

According to an embodiment of the method, a configuration message including configuration changes to the application and a corresponding effective date when the configuration changes are to be applied to the application is received. Following the receipt of the configuration message, the message is stored. When the effective date occurs, the configuration changes from the received configuration message are applied to the current configuration of the application.

After the configuration changes from the received configuration message are applied, the method may also include broadcasting the current configuration of the application, which includes the configuration changes, by sending an electronic mail message including the current configuration to a plurality of subscribers.

The method may further include determining if the configuration changes from the configuration message conflict with other stored configuration changes. If a determination is made that the configuration changes do conflict with other stored configuration changes, then a conflict message is sent to the originator of the configuration message.

The configuration message may be an electronic mail message. Furthermore, the configuration message may be encrypted using a public key. The configuration changes may include a set of name value pairs.

Moreover, the method may include receiving a request for the current configuration of the application. In response to the request, a response message is sent including the current configuration of the application.

In accordance with another embodiment of the present invention, a method is for remotely changing a runtime configuration of an application. According to the method, a message is received, and a determination is made whether the message includes a request for the current configuration of the application. If the message does include such a request, then a response message is sent including the current configuration of the application. If the message does not include a request for the current configuration of the application, then a determination is made whether the message includes configuration changes to the application and a corresponding effective date when the changes are to be applied to the application. If the message includes configuration changes and a corresponding effective date, then the configuration changes are applied to the current configuration of the application when the effective date occurs.

In accordance with another embodiment of the present invention, a system is for remotely changing a runtime configuration of an application. The system includes an application configuration interface. The application configuration interface receives a configuration message that includes configuration changes to the application and a corresponding effective date when the configuration changes are to be applied to the application. After the application configuration interface receives the configuration message, the interface stores the message in a database. When the effective date occurs, the application configuration interface applies the configuration changes from the configuration message to the current configuration of the application.

These and various other features as well as advantages, which characterize the present invention, will be apparent from a reading of the following detailed description and a review of the associated drawings.

BRIEF DESCRIPTION OF THE DRAWINGS

FIGS. 2A-2D are flow diagrams showing an illustrative process for managing an application configuration according to an embodiment of the present invention.

DETAILED DESCRIPTION OF THE PREFERRED EMBODIMENT

Figure 1:
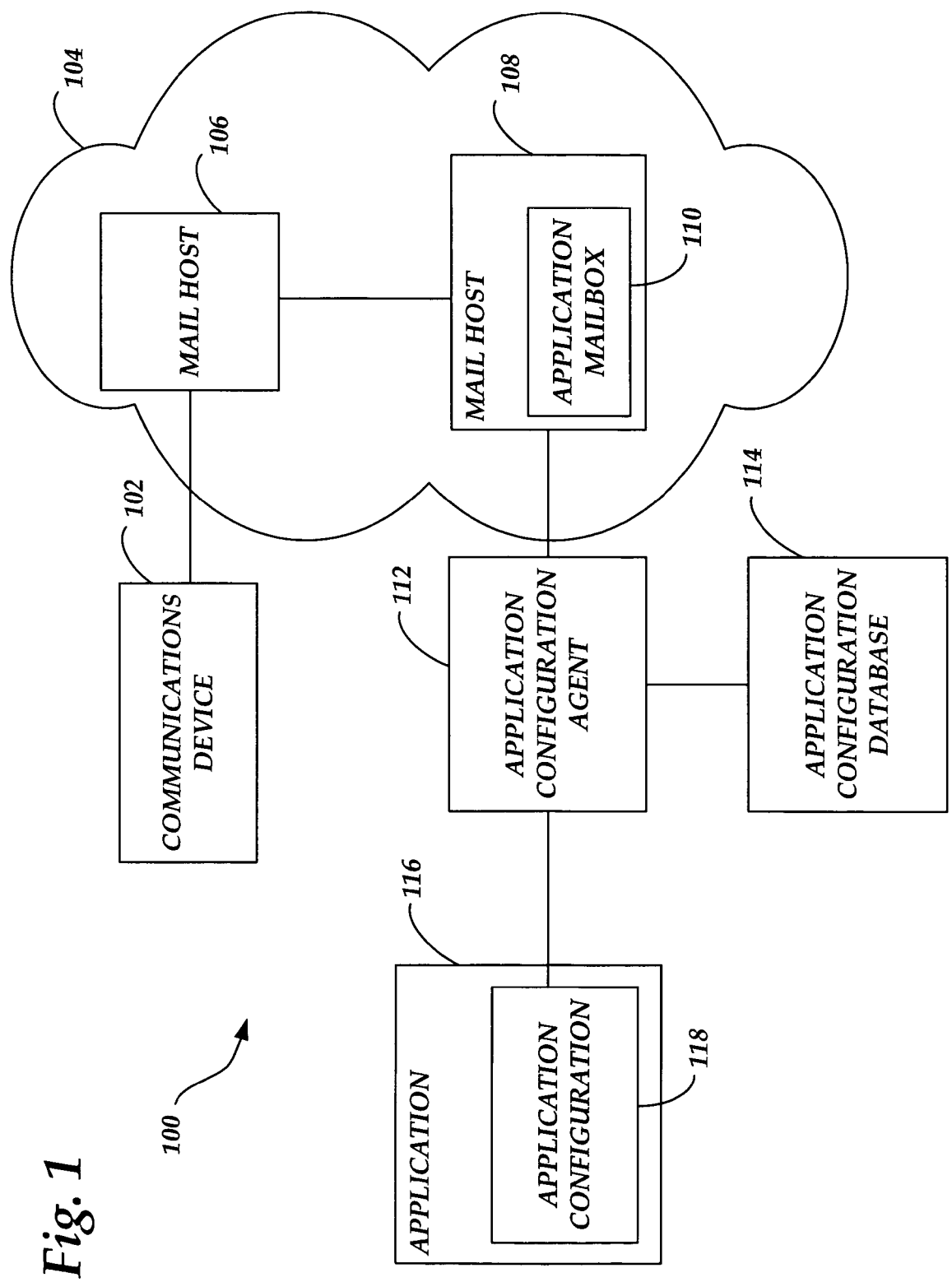
FIG. 1 is a block diagram of a system for managing an application configuration according to an embodiment of the present invention.
Figure 2B:
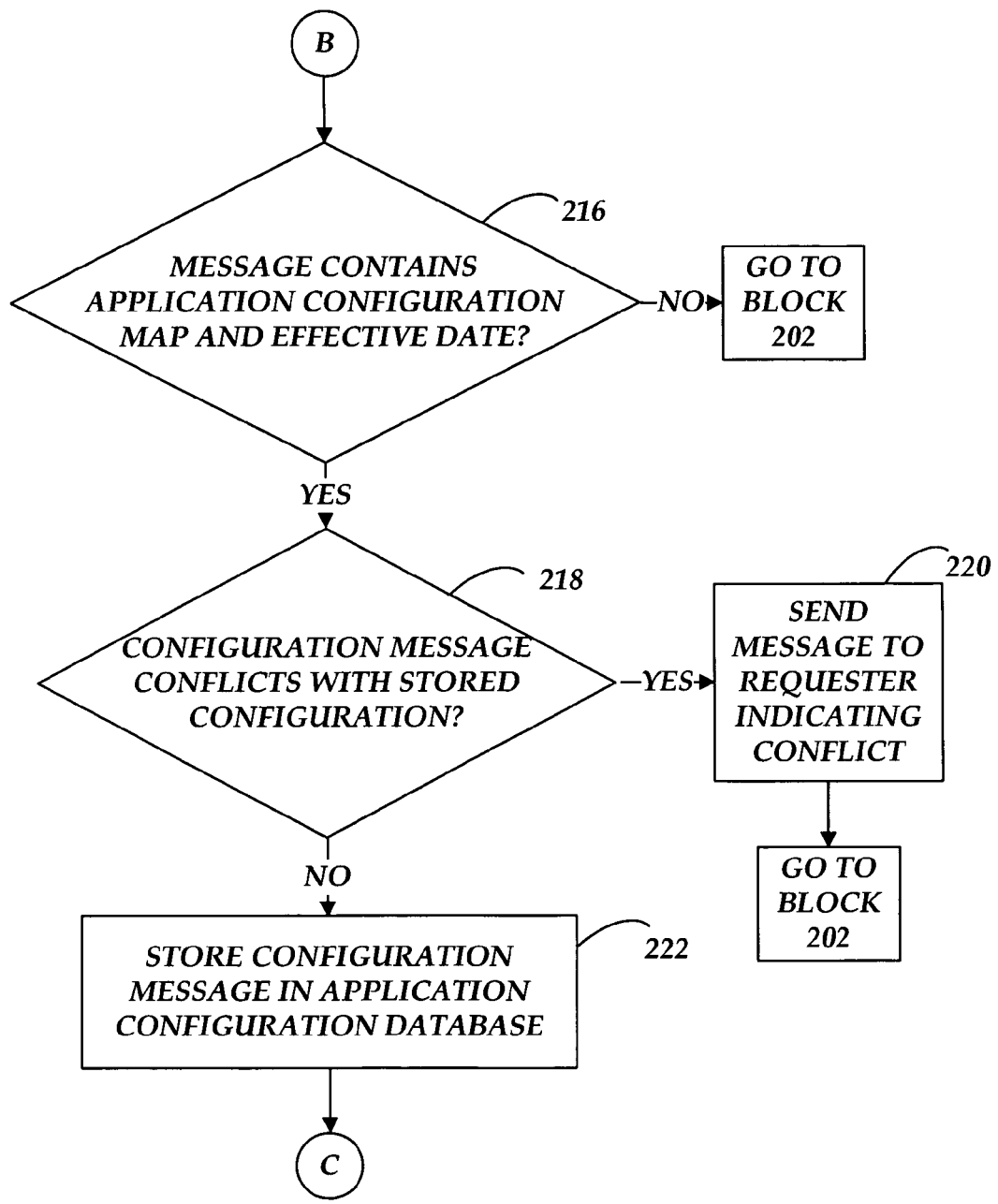
Figure 2C:
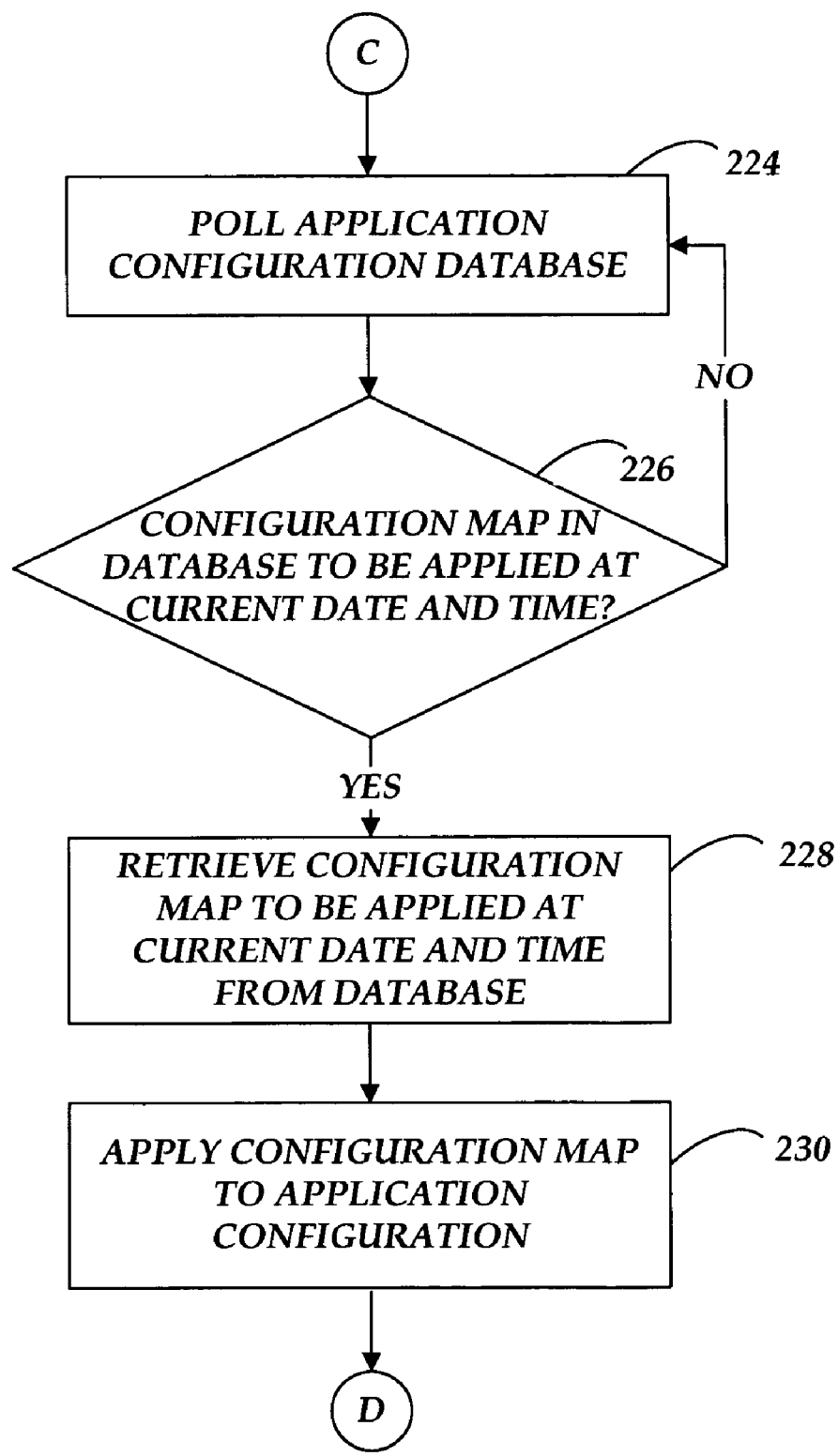
Figure 2D:
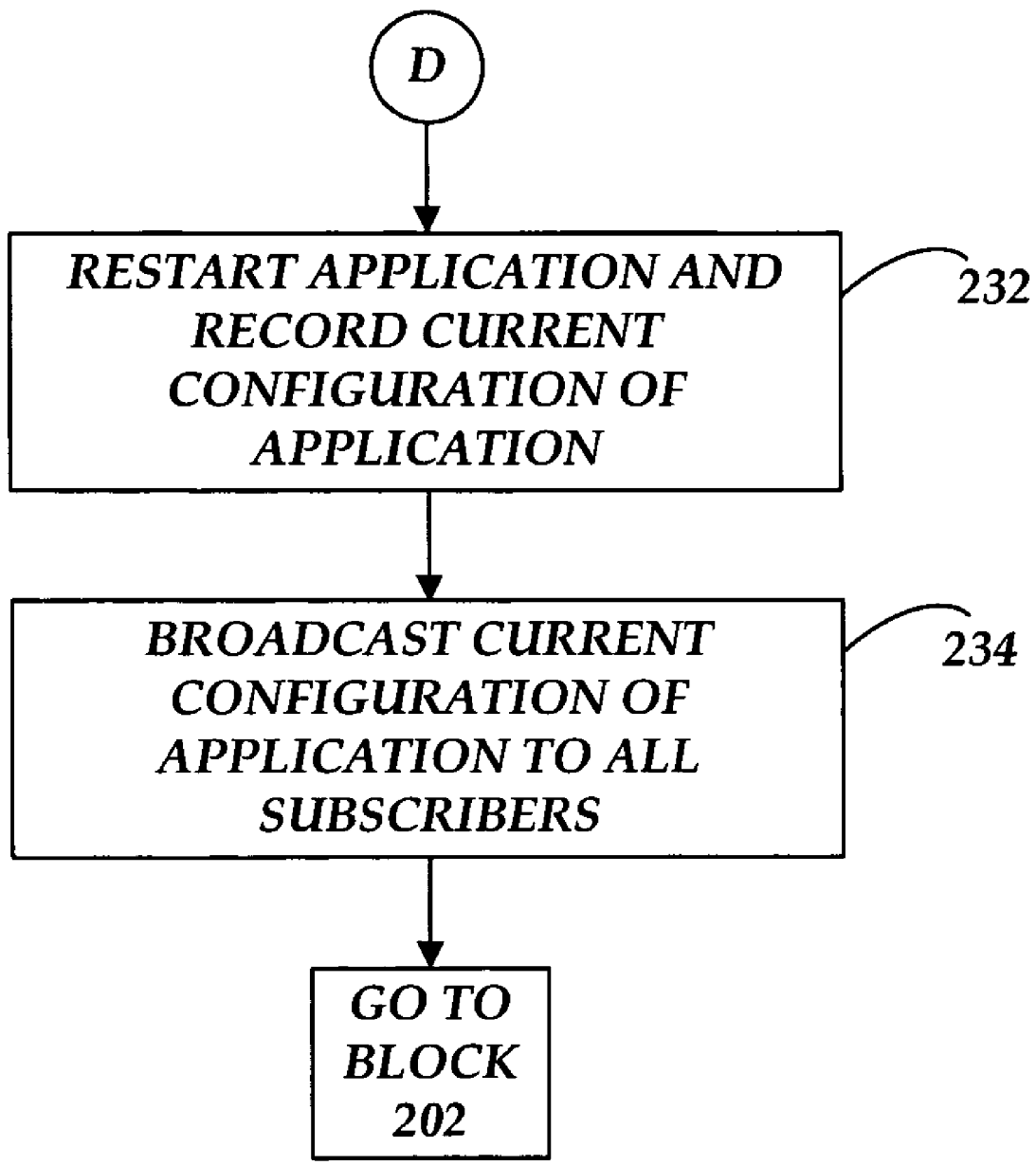

Embodiments of the present invention provide for methods and systems for managing an application configuration by messaging over a communications network. When updates to an application configuration need to be made, a message including the configuration changes may be transmitted to an application configuration agent which applies the received configuration changes to the application configuration. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 is a block diagram of a system 100 for changing a configuration of an application including components of a communications network 104 for transmitting messages to and from an application configuration agent 112. It will be appreciated by those skilled in the art that the communications network 104 may be a local-area network ("LAN"), a wide-area network ("WAN"), or any other network capable of transmitting electronic mail ("e-mail") messages. The system 100 further comprises a communications device 102 for sending e-mail messages to and receiving e-mail messages from the application configuration agent 112. It will be appreciated that the communications device 102 may include, but is not limited to, a computer, wireless telephone, pager, or personal digital assistant device.

When an email message is composed and sent from the communications device 102 to the application configuration agent 112, an e-mail client (not shown) residing on the communications device connects to a Simple Mail Transfer Protocol ("SMTP") server (not shown) associated with a mail host 106 and provides the SMTP server with the e-mail message. The SMTP server associated with the mail host 106 connects with a SMTP server (not shown) associated with a mail host 108 and provides the e-mail message to the SMTP server. Upon recognizing the recipient of the e-mail message, the SMTP server associated with the mail host 108 then passes the e-mail message to an application mailbox 110 associated with the application configuration agent 112. An Internet Mail Access Protocol ("IMAP") server (not shown) associated with the mail host 108 is used by the application configuration agent 112 to read and write to the application mailbox 110.

The application configuration agent 112 is a program module associated with an application configuration 118 of an application 116. The application 116 includes a program or group of programs designed to perform specific functions for end users. The application configuration 118 includes a plurality of name value pairs which define the configuration of the application 116. In an embodiment of the present invention, an e-mail message sent from the communications device 102 to the application configuration agent 112 may include an application configuration map and an effective date which includes a date and time when the application configuration map is to be applied. The application configuration map includes a set of name value pairs which are applied by the application configuration agent 112 to the application configuration 118, at the effective date, to change the configuration of the application 116. In another embodiment of the present invention, the e-mail message from the communications device 102 to the application configuration agent may include a request for the current application configuration 118. E-mail messages that are sent between the communications device 102 and the application configuration agent 112 are encrypted and decrypted using a security system such as, for example, a public key ("PKI") system to ensure that the transaction is carried out privately and that changes to the application configuration are only being made by those authorized to make such changes.

The system 100 further comprises an application configuration database 114 associated with the application configuration agent 112. The application configuration database 114 contains a list of all application configuration maps that have been applied to the application configuration 118 as well as any application configuration maps to be applied to the application configuration in the future. Each application configuration map stored in the application configuration database 114 includes an effective date indicating when the map is to be applied. The application configuration agent 112 periodically polls the application mailbox 110 to determine if any e-mail messages have been received. E-mail messages in the application mailbox 110 are decrypted and read by the application configuration agent 112. If the e-mail message includes an application configuration map and an effective date, the application configuration agent 112 stores the message in the application configuration database 114. In an embodiment of the present invention, the application configuration agent 112 may determine whether the application configuration map associated with an e-mail message conflicts with application configuration maps stored in the application configuration database 114. If a conflict exists, then the application configuration agent 112 sends a message back to the sender of the e-mail message regarding the conflict. If the e-mail message includes a request for the current application configuration 118, the application configuration agent 112 sends an e-mail message back to the requester including the current application configuration 118.

The application configuration agent 112 is periodically triggered by an operating system scheduler to contact the application configuration database 114 to retrieve the application configuration map scheduled to be applied to the application configuration 118. It will be appreciated by those skilled in the art that the operating system scheduler is a system process present in most operating systems. The application configuration agent 112 reads the effective dates of the application configuration maps stored in the application configuration database 114, and if one of the effective dates is equal to a current date, then the application configuration agent 112 retrieves the associated application configuration map and applies it to the application configuration 118. In an embodiment of the present invention, once the application configuration map is applied and the application 116 is restarted, the application configuration agent 112 may broadcast the updated configuration application 118 to a list of subscribers interested in receiving a message when the application configuration 118 is changed.

FIGS. 2A-2D illustrates a flowchart describing a process 200 for managing an application configuration by messaging over a communications network 104 of FIG. 1, according to an embodiment of the invention. The process 200 begins at block 202 where the application configuration agent 112 periodically polls the application mailbox 110. As described above, e-mail messages sent to the application configuration agent 112 from the communications device 102 are collected in the application mailbox 110 associated the application configuration agent 112. From block 202, the process 200 continues to block 204, where the application configuration agent 112 determines whether any e-mail messages have been received at the application mailbox 110. If an e-mail message has been received at the mailbox 110, the process 200 proceeds to block 206. However, if no e-mail messages have been received, then the process 200 proceeds back to block 202, where the application configuration agent 112 continues to poll the application mailbox 110.

At block 206, the application configuration agent 112 determines whether the e-mail message is from an authorized sender by attempting to decrypt the message using the sender's public key. The email address of every sender is mapped to its public key in the application configuration database. In an embodiment of the present invention, a number of subscribers interested in receiving updates when the configuration of the application 116 changes may be authorized to request and receive a copy of the most current application configuration 118 from the application configuration agent 112. Out of those individuals, a limited number of developers of the application 116 may also be authorized to send updates and changes to the application configuration agent 112 to be applied to the application configuration 118. If the application configuration agent 112 is able to decrypt the message, then the process 200 proceeds to block 210. If, on the other hand, the application configuration agent 112 is unable to decrypt the message using the sender's public key, the process 200 proceeds to block 208, where the agent sends a response message to the sender of the e-mail message that the sender is unauthorized. The process 200 then proceeds back to block 202, where the application configuration agent 112 continues to poll the application mailbox 110 for new messages.

At block 210, the application configuration agent 112 reads the decrypted e-mail message and determines if the message contains a request for a copy of the current application configuration 118 of the application 116. If the agent 112 determines that the e-mail message is requesting a copy of the current application configuration 118, then the process 200 proceeds to block 212, where the agent retrieves the current application configuration 118. When the configuration 118 of the application 118 is updated, the application 116 is restarted, and the application configuration agent 112 stores the updated, or most current, configuration 118 of the application 116 in memory. After retrieving the most current configuration 118 of the application 116, the application configuration agent 112 sends a message to the requester including the most current application configuration 118 at block 214. Having a copy of the current application configuration 118 allows a developer of the application 116 to determine what may be causing issues with the application 116 and what is the most efficient way to update the application configuration 118. The process 200 then proceeds back to block 202, where the application configuration agent 112 continues to poll the application mailbox 110 for new messages.

If, back at block 210, the application configuration agent 112 determines that the e-mail message is not requesting a copy of the current application configuration 118, the process proceeds to block 216, where the agent 112 determines if the e-mail message includes an application configuration map and a corresponding effective date. If the application configuration agent 212 determines that the e-mail message does not contain a map and effective date, then the process 200 proceeds back to block 202, where the application configuration agent 112 continues to poll the application mailbox 110 for new messages. If, however, the application configuration agent 112 determines that the e-mail message does include an application configuration map and a corresponding effective date, then the process proceeds to block 218.

At block 218, the application configuration agent 112 determines whether the application configuration map associated with the e-mail message conflicts with any configuration maps already stored in the application configuration database 114. In order to determine if a conflict exists, the application configuration agent 112 compares the configuration map associated with the received e-mail to the configuration maps stored in the database 114. For example, the agent 112 compares the maps to determine whether the received configuration map is identical to the current configuration of the application 116. If so, the process 200 proceeds to block 220, where the application configuration agent 112 sends a response message to the sender of the configuration e-mail message explaining the conflict and stating that the conflict needs to be resolved before the sender's application configuration map can be stored in the database 114 and applied to the application 116. From block 220, the process 200 proceeds back to block 202.

If, back at block 218, the application configuration agent 112 determines that the application configuration map associated with the e-mail message does not conflict with any configuration maps already stored in the application configuration database 114, then the process 200 proceeds to block 222, where the application configuration agent 112 stores the received application configuration map and corresponding effective date in the application configuration database 114. From block 222, the process 200 proceeds to block 224 where, periodically, the operating system scheduler associated with the application configuration agent 112 triggers the agent 112 to poll the application configuration database 114. The application configuration agent 112 determines whether the database 114 contains an application configuration map to be applied at the current date and time at block 226. While polling the database 114, the application configuration agent 112 reviews the effective dates of the application configuration maps stored in the database. If, at block 226, the application configuration agent 112 determines that one of the effective dates is before the next date and time of polling and equal to or after the current date and time, then the process 200 proceeds to block 228, where the agent 112 retrieves the application configuration map corresponding to the effective date equal to the current date and time. The process 200 then proceeds to block 230. If, on the other hand, the application configuration agent 112 determines that the effective dates of the application configuration maps stored in the application configuration database 114 are not before the next date and time of polling nor equal to or after the current date and time, then the process 200 proceeds back to block 224, where the agent 112 continues to periodically poll the database 114.

At block 230, the application configuration agent 112 applies the retrieved application configuration map to the application configuration 118 associated with the application 116. As discussed above, the application configuration map includes at least one set of name value pairs which, when applied, changes the current application configuration 118. After the application configuration map is applied, the process 200 proceeds to block 232 where the application configuration agent 112 restarts the application 116 and records the updated, or most current, configuration 118 of the application 116, which includes the changes instigated by the applied application configuration map. The process 200 then proceeds to block 234, where the application configuration agent 112 broadcasts the updated, or most current, application configuration 118 to all of the authorized subscribers interested in receiving updates when the configuration of the application 116 changes. The application configuration agent 112 sends an e-mail message to each of the authorized subscribers including a copy of the current application configuration 118, which includes the changes instigated by the applied application configuration map. The process 200 then proceeds back to block 202, where the application configuration agent 112 continues to poll the application mailbox 110 for new messages.

It will be appreciated that the embodiments of the invention described above provide for systems and methods for managing an application configuration by messaging over a communications network. Changes and updates to an application configuration can be sent to an application configuration agent which applies the changes and updates to the configuration of an application, eliminating the need for assistance from an application operator. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A method for remotely changing a runtime configuration of an application to be configured, comprising:
    at the application to be configured, polling a message queue for reception of a configuration message from a remote messaging originator using an application configuration agent residing at the application, wherein the configuration message includes configuration changes to be made to the application and an effective date, including a date and time when the configuration changes are to be applied to the application;
    when the configuration message is in the message queue at the application, determining if the configuration changes from the configuration message conflict with other stored configuration changes;
    if the configuration changes from the configuration message conflict with other stored configuration changes, then sending a conflict message to an originator of the configuration message;
    if the configuration changes from the configuration message do not conflict with other stored configuration changes:
    storing the configuration message in an application database in the application; and
    applying the configuration changes from the configuration message stored in the application database to a current configuration of the application when the effective date occurs using the application configuration agent, wherein the application configuration agent is a program module residing at the application.

2. The method of claim 1, further comprising:
    receiving a request for the current configuration of the application; and sending a response message including the current configuration of the application.

3. The method of claim 2, wherein the request is an electronic mail message.

4. The method of claim 1, further comprising after applying the configuration changes from the configuration message to the current application of the application when the effective date occurs, then broadcasting an updated configuration of the application, wherein the updated configuration includes the configuration changes from the configuration message.

5. The method of claim 4, wherein broadcasting the updated configuration of the application comprises sending an electronic mail message including the updated configuration to a plurality of subscribers.

6. The method of claim 1, wherein the configuration message is an electronic mail message.

7. The method of claim 1, wherein the configuration message is encrypted using a public key.

8. The method of claim 1, wherein the configuration changes to the application include at least one of set of name value pairs.

9. A method for remotely changing a runtime configuration of an application, comprising:
    at the application to be configured, polling a message queue for reception of a configuration message from a remote messaging originator using an application configuration agent residing at the application, wherein the configuration message includes a request for a current configuration of the application;
    if a message is received at the message queue, determining whether the received message includes a request for a current configuration of the application, and sending a response message including the current configuration of the application when the received message includes a request for a current configuration of the application;
    if a message is received at the message queue, determining whether the received message includes configuration changes to the application and an effective date, including a date and time, wherein the configuration changes are to be applied to the application when the received message does not include a request for a current configuration of the application;
    if the received message includes configuration changes to the application and an effective date, including a date and time, when the configuration changes are to be applied to the application, then determining if the configuration changes form the configuration message conflict with other stored configuration changes;

if the configuration changes from the configuration message conflict with other stored configuration changes, then sending a conflict message to an originator of the configuration message; and if the configuration changes from the configuration message do not conflict with other stored configuration changes, storing the configuration message in an application database at the application and applying the configuration changes form the configuration message to the current configuration of the application when the effective date occurs using the application configuration agent, wherein the application configuration agent is a program module residing at the application.

10. The method of claim 9, further comprising: receiving a request for the current configuration of the application; and sending a response message including the current configuration of the application.

11. The method of claim 10, wherein the request is an electronic mail message.

12. The method of claim 9, further comprising after applying the configuration changes from the configuration message to the current application of the application when the effective date occurs, then broadcasting an updated configuration of the application, wherein the updated configuration includes the configuration changes from the configuration message.

13. The method of claim 12, wherein broadcasting the updated configuration of the application comprises sending an electronic mail message including the updated configuration to a plurality of subscribers.

14. The method of claim 9, wherein the configuration message is an electronic mail message.

15. The method of claim 9, wherein the configuration message is encrypted using a public key.

16. The method of claim 9, wherein the configuration changes to the application include at least one of set of name value pairs.

* * * * *